UNITED STATES PATENT OFFICE.

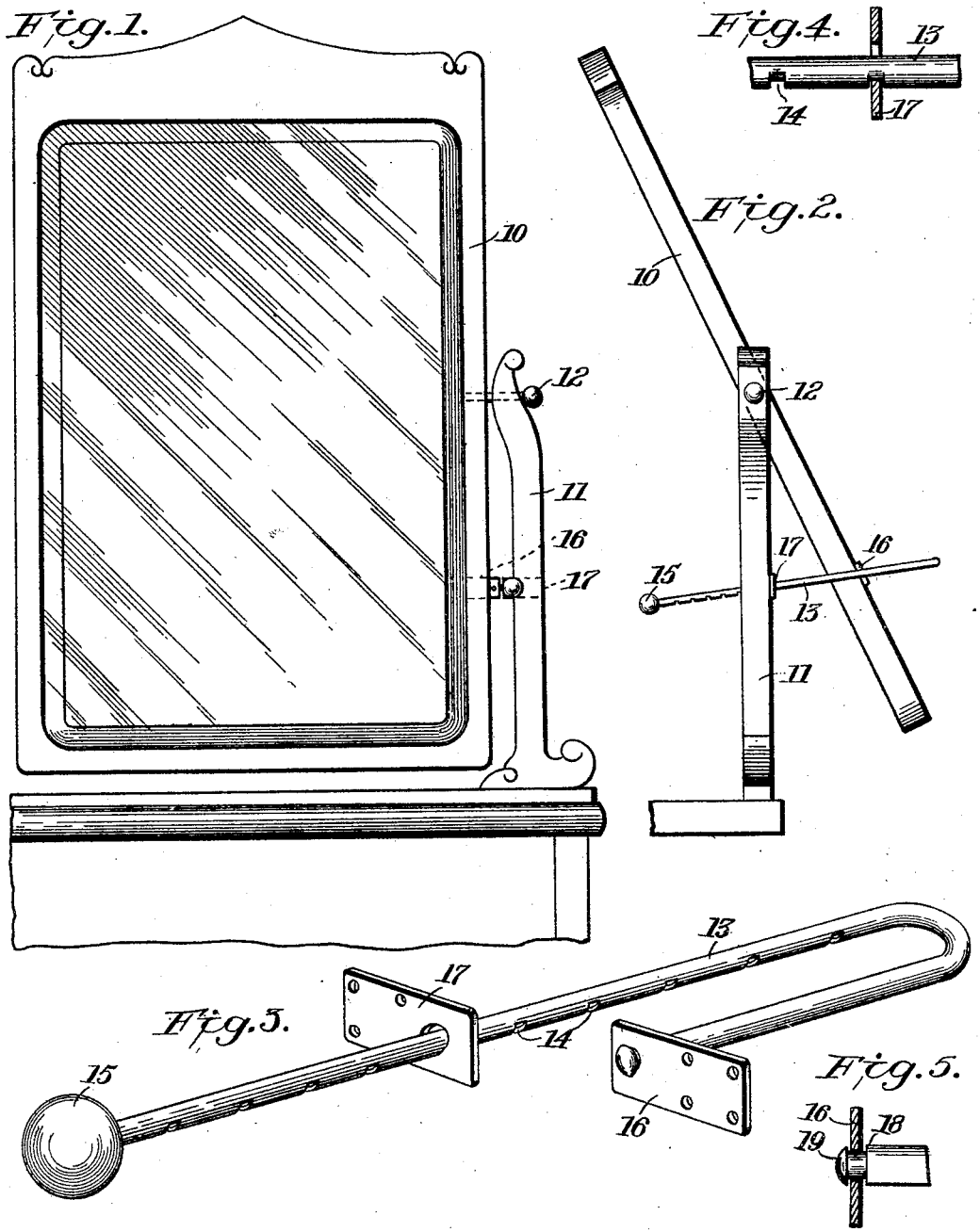

EDWARD A. J. GERMAIN, OF MILFORD, CONNECTICUT.

ADJUSTING DEVICE FOR MIRRORS.

No. 931,291.          Specification of Letters Patent.          Patented Aug. 17, 1909.

Application filed March 29, 1909. Serial No. 486,369.

*To all whom it may concern:*

Be it known that I, EDWARD A. J. GERMAIN, a citizen of the United States, residing at Milford, county of New Haven, State of Connecticut, have invented an Improvement in Adjusting Devices for Mirrors, of which the following is a specification.

This invention relates to mirror holding devices and has particular reference to means for varying the angle of rest of pivoted mirrors such as are commonly employed on bureaus.

The object of my invention is to provide a simple device which may be attached to any pivoted mirror, either in the factory or the home, and which will enable the mirror to be adjusted to the desired angle and to be locked in that position against possibility of accidental shifting.

To this end, my invention consists in the construction and combination of parts substantially as hereinafter described and claimed.

Of the accompanying drawings:—Figures 1 and 2 are respectively front and side elevations of a pivoted bureau mirror and support, having my improved attachment in one of its embodiments applied thereto. Fig. 3 is a perspective view of a preferred form of my attachment. Fig. 4 is a detail view of a portion of the notched rod or bar and the coöperating locking plate. Fig. 5 is a detail view of the end of the rod or bar and a section of the plate to which it is loosely connected.

Similar reference characters indicate the same or similar parts in all the views.

10 denotes a mirror, 11 one of the side supports, and 12 the usual pivot on which the mirror swings.

The attachment comprises a bar or rod 13 having notches 14 and preferably a suitable handle as at 15, and two plates 16 and 17 having screw holes by which they may be attached to the mirror and mirror support. The plate 16 is preferably attached to the back of the mirror frame and the plate 17 to the back of a support 11. The plate 16 is herein referred to as the attaching plate because it is so connected with the end of the rod that the latter will have no endwise movement relatively thereto although having a sufficiently loose connection to enable the rod or bar to follow the arc of movement of the mirror on its pivot 12, and the plate 17 is referred to as the locking plate because it coacts with the notches of the rod or bar to lock the mirror in its adjusted position. The connection of the attaching plate 16 to the end of the adjusting bar 13 may be any suitable one that provides for the functions above stated, such as by forming the end of the bar with a shoulder 18 and a head 19 as in Fig. 5, the intermediate portion of the rod loosely fitting a hole in the plate.

The locking plate 17 has a hole which is of sufficient size to enable the rod or bar to pass freely through it and to be so shifted as to cause any one of the notches 14 to engage the edge of such hole. With said plate 17 attached to a support 11, any longitudinal adjustment of the rod through it will cause the mirror to be swung on its pivots and to be locked by engagement of a notch 14 with the edge of the hole. The rod or bar may be round as in Fig. 3, said rod or bar being doubled upon itself so that the mirror can be swung to either side of the plane of the support 11, as will be obvious by comparing Figs. 2 and 3.

Having now described my invention, I claim—

A mirror adjusting mechanism, comprising a bar doubled upon itself and having one portion provided with notches, an attaching member loosely connected with the other portion of the bar, and a locking member adapted to engage with either of said notches, said locking member comprising a plate having a hole larger than the said bar, said bar having its two portions separated sufficiently to enable the mirror to swing past a vertical plane.

In testimony whereof I affix my signature in presence of two witnesses.

EDWARD A. J. GERMAIN.

Witnesses:
     A. M. WOOSTER,
     S. W. ATHERTON.